(12) United States Patent
Jacob et al.

(10) Patent No.: US 11,349,918 B2
(45) Date of Patent: May 31, 2022

(54) DISTRIBUTED COMPUTING RESERVATION PLATFORM FOR STORING AND HANDLING SHARED DATA RECORDS

(71) Applicant: AMADEUS S.A.S., Biot (FR)

(72) Inventors: Sylvain Jacob, Antibes (FR); David Bessiere, Grasse (FR); Cyril Deguet, Vallauris (FR)

(73) Assignee: AMADEUS S.A.S., Biot (FR)

( * ) Notice: Subject to any disclaimer, the term of this patent is extended or adjusted under 35 U.S.C. 154(b) by 87 days.

(21) Appl. No.: 16/951,497

(22) Filed: Nov. 18, 2020

(65) Prior Publication Data

US 2021/0194956 A1 Jun. 24, 2021

(30) Foreign Application Priority Data

Dec. 19, 2019 (FR) .................................... 1914844

(51) Int. Cl.
*H04L 67/1095* (2022.01)
*G06F 9/445* (2018.01)
*G06Q 50/14* (2012.01)
*H04L 67/1097* (2022.01)
*G06F 16/27* (2019.01)

(52) U.S. Cl.
CPC ...... *H04L 67/1095* (2013.01); *G06F 9/44505* (2013.01); *G06F 16/27* (2019.01); *G06Q 50/14* (2013.01); *H04L 67/1097* (2013.01)

(58) Field of Classification Search
CPC ............. H04L 67/1095; H04L 67/1097; G06F 9/44505; G06F 16/27; G06F 16/182; G06F 16/13; G06F 16/172; G06F 16/176; G06F 16/184; G06Q 50/14
See application file for complete search history.

(56) References Cited

U.S. PATENT DOCUMENTS

| | | | |
|---|---|---|---|
| 8,843,441 B1 * | 9/2014 | Rath ..................... | G06F 16/273 707/614 |
| 9,367,560 B1 | 6/2016 | Ely et al. | |
| 10,635,650 B1 * | 4/2020 | Chud .................. | G06F 16/2282 |
| 2015/0261804 A1 | 9/2015 | Vemuri et al. | |
| 2019/0102418 A1 * | 4/2019 | Vasudevan .......... | G06F 16/2358 |

* cited by examiner

*Primary Examiner* — Michael A Keller
(74) *Attorney, Agent, or Firm* — Perry + Currier

(57) ABSTRACT

A system and a method for handling and storing data records are provided. A software application is configured to process user requests and accordingly generate a master data record that is associated with at least one user and/or a user application. The software application further generates a partition token, which is used by a routing module to route the user request for storing a master data record to the master storage partition associated with the partition identifier indicated in the generated partition token.

14 Claims, 8 Drawing Sheets

DISTRIBUTED COMPUTING RESERVATION PLATFORM FOR STORING AND HANDLING SHARED DATA RECORDS

CROSS REFERENCE TO RELATED APPLICATIONS

This application claims priority to French patent application no. 1914844, filed Dec. 19, 2019, the contents of which is incorporated herein by reference.

FIELD

The specification relates to a distributed computing platform for storing and handling data records. More specifically, the specification relates to a travel reservation computing platform configured for storing and handling data records shared between different user applications, such as Passenger Name Record (PNR) files.

BACKGROUND

Cloud computing has enabled the large-scale deployment of software applications, which can be accessed by a plurality of user for the provision of a predetermined service. In general, a cloud-based distributed software application is instantiated on a plurality of computing servers dusters of at least one data centre. In many cases, to ensure continuous operation and quick access, the software application may be configured to run on the computing resources of different data centres, located in different geographical locations.

In the travel sector, cloud-based distributed computer reservation platforms have been introduced that allow users, such as travel agents (TA), to search and book travel products from a plurality of travel service providers, e.g. flights from different airlines. A unique Passenger Name Record (PNR) data record is created for each travel booking, which may be associated with a set of users and travel applications. Each PNR contains a range of details regarding the passenger, the travel operator, the price, and the like, which are shared among different users and travel applications. For example, a PNR may be accessed by the TA that made the travel reservation, the passengers, the airline operators providing the service, and a range of associated travel applications, e.g. departure control system (DCS). The PNRs generated by the travel reservation platform may be stored in a shared storage module, which may be accessible by different users, e.g. travel operators, TAs, and the like. The shared storage module may be instantiated on a technical infrastructure that uses computing resources shared among the different user. However, this approach has the disadvantage that during a scheduled or non-scheduled shutdown would impact all user sharing the same resources. For example, in the case of maintenance work carried out by one user, which may require the shutdown of shared computing resources, other users of the platform would be impacted. Similarly, in the case of an unexpected shutdown of the computing resources, e.g. failure, all users of the platform would be impacted. Furthermore, depending on the user's activity and data volume generated the performance experienced by different users would be considerably impacted. For example, very active user would consume most of the shared computing resources causing performance issues for other users.

SUMMARY

There is a need to provide a distributed computing platform with the ability to isolate the computing resources allocated to the different users while ensuring the continuous operation of the software application and its robustness, especially in terms of transactions involving several users.

The specification provides a distributed computing platform for handling and storing data records and a corresponding method, which allows the isolation of different users while ensuring the continuous operation of the software application and its robustness, especially in terms of transactions involving several users.

According to a first aspect of the specification, a distributed computing platform for handling and storing data records is provided. The computing platform running on a plurality of computing server clusters of at least one data centre, the distributed computing platform comprising: a communication logic configured for receiving data creation requests from a plurality of users; a software application running a computer programme configured to process each data creation user request and accordingly generate one master data record associated with at least one user and/or user application; a storage module comprising a plurality of storage partitions for storing data records, each storage partition is assigned a partition identifier indicating the storage partition associated with each user and configuration of the storage partition as a master, configured for storing master data records, or slave, configured for storing copies of the master data records; and a routing module configured to at least route each generated master data record to the corresponding master storage partition associated with the user issuing the data creation request; wherein the software application is configured to generate for each master data record a corresponding partition token indicating the partition identifier of the master storage partition corresponding to the user issuing the data creation request; and wherein the routing module is configured to route each master data record to the master storage partition associated with the partition identifier of the generated partition token.

According to an embodiment of the specification, the software application is configured to generate copies of the master data records, which are stored in the slave storage partitions of the users and/or user applications associated with the master data record.

According to an embodiment of the specification, the communication logic is configured to receive user access requests for accessing a stored master data record and/or a copy of a master data record, the software application is configured to generate for each user access request a partition token identifying the corresponding master or slave storage partition storing the requested data record, the routing module is configured to route each of the user access requests, based on the generated partition token, to the corresponding master or slave storage partition.

The specification enables user requests for accessing or storing data records to be efficiently routed to the correct storage partitions, also referred to as peak storage. The use of a partition token enables the quick identification of the correct storage partition for storing data records while ensuring isolation of the different users. The partition token acts as a routing key, which enables the routing logic to efficiently direct user requests for storing or accessing data records to the correct storage partition. With the use of the partition token, it is possible to segregate the information that becomes available to the different users of the distributed computing platform, while enabling the scaling of the available computing resources to ensure the continuous operation of the platform according to the user demand. Each master data record may be associated with at least one master user, e.g. the user creating the master data record, and at least one-second user and/or user application that is configured to consume the information contained in the master data record and/or update the master data record. For example, in the content of the travel industry, a master Passenger Name Record (PNR) created by a Travel Agent (TA) may also be accessible in read/write mode by the travel provider e.g., an airline, operating the travel service. As such, a travel provider is able to make changes to the master PNR when required e.g. change of the passenger name or travel date on the ticket. For each master data record, the software application may generate a number of copies, which are stored in the storage partitions of the users and/or user applications associated with the master data record. The copies of the master data record may be read-only, thus allowing for the information contained in the master data record to be changed only by authorised users. For example, in the case of a travel data record, e.g. a Passenger Name Record (PNR), generated by a first user, e.g. a Travel Agent (TA), a number of PNR copies may be generated for consumption by different users and/or user applications associated with the master travel record during its validity e.g. travel operators, passenger, travel applications, and the like. Each user and/or user application requests access to the master data record, and depending on their credentials and type of request, are directed either to the master storage partition storing the requested master data record or to a slave storage partition storing a copy of the requested master data record. For example, in the case of an authorised user request for a change in the information contained in the PNR, the corresponding user request would be directed to the storage partition storing the requested master PNR data record suing the generated partition token, while a user request for consuming PNR information for the provision of a travel service, e.g. boarding, would be directed to the storage partition associated with the corresponding user that stores a copy of the read-only copy of the master PNR. In order to differentiate between different users, each storage partition comprises a storage partition identifier, which may indicate the user associated with the storage partition and whether the storage partition is configured as a master or a slave storage partition. The partition token is configured to match the user data request with the correct storage partition identifier, thus allowing the routing module to route the user data request for storing and/or accessing data records to the correct storage partition.

According to an embodiment of the specification, the software application comprises a configuration file comprising storage partition configuration information indicating the master and/or slave storage partitions associated with each user.

The configuration file enables changes to be made to the allocation of storage partitions to the users and corresponding configuration without any impact on the operation of the distributed computing platform. In this way, any changes in the storage partition allocation may be quickly adopted by the software application for the generation of partition tokens, thus ensuring that user requests are routed to the correct storage partitions. For example, in the case where the master storage partition of a user becomes unavailable, e.g. faulty data centre, another storage partition may be allocated as a master for the same user in the configuration file, thus enables traffic to be directed from the defective master storage partition to the new master storage partition. Similarly, the list of storage partitions and corresponding identifiers may be adjusted, e.g. adding or deleting storage partition information.

According to an embodiment of the specification, the software application is configured to generate the partition token based on the configuration file, and/or the identity of the user issuing the data request, and/or the type of access request. According to embodiments of the specification, the software application comprises a record locator module configured for locating data records in response to the user data record access request. The record locator module may comprise a cache configured for storing the location of each master data record in the storage module. For example, the record module may store in the cache a list identifying for each master data record the corresponding storage partition location. Moreover, the record locator may comprise a data record broadcasting mechanism, which in response to a user request for accessing a data record, is configured for checking each storage partition to determine the exact location of the requested data record. The broadcasting mechanism may transmit a request for retrieving a data record to each storage partition, with details of the requested data record. Each storage partition may process the request from the broadcasting mechanism and accordingly send a response signal to the broadcasting mechanism indicating whether the requested data record is located in the storage partition. The broadcasting mechanism may be configured to process the responses received from each storage partition to identify the storage partition that contains the requested data record.

The partition token is generated using a range of information that may enable locating the correct storage partition for directing user requests. In this way, the response time to a user request may be significantly reduced while ensuring that the information shared between the different users remain isolated. Furthermore, the use of the record locator module may enhance the speed for retrieving data records from the different storage partition. The record location module may operate in combination with the partition token generation or as an isolated process.

According to an embodiment of the specification, the computing platform is instantiated on computing server clusters of multiple data centres.

According to an embodiment of the specification, the data centres are connected via a message data stream.

According to an embodiment of the specification, a copy of each master data record is pushed to the message stream for replication in associated user storage partitions.

According to an embodiment of the specification, each storage partition comprises a data consumer application configured to monitor the message data stream and retrieve, based on a set of selection criteria, copies of data records associated with the user of each storage partition.

According to an embodiment of the specification, the selection criteria comprise the user identity associated with a data record, the geographic location of the user, and content of the data record.

The distributed platform of the specification is configured to run on computing server clusters of a plurality of data centres, which may be located in different geographic location. The communication logic may be configured for routing user requests to the software application running on a data centre, which located closest to the geographic location of the user initiating the request. In this way, the response latency to a user request may be significantly reduced. Moreover, different data centres may be used to back-up information, thus enabling for user traffic to be redirected from a defective data centre to a back-up data centre to ensure the continuous operation of the distributed computing platform in providing the requested service to the users. The data centres may be connected via a data stream, whereby copies of data records are pushed for replication. Each storage partition may comprise a data consumer application, which is configured to monitor the message data stream and retrieve, based on a set of criteria, e.g. configuration rules, copies of data records associated with the users of each storage partition. For example, a copy of a Passenger Name Record (PNR) data record generated by a Travel Agent (TA) may be pushed to the message data stream for replication in other storage partitions of users and/or user applications associated with the master PNR e.g. travel providers, travel applications, flight boarding applications, and the like. Storage partitions may be configured to store standby copies of the master data record, which may be activated in the case there is an issue with the storage partition storing the master data record copies. The storage partitions may be distributed across the different data centres. The data centres may be distributed across different geographical regions, to improve resiliency and minimise latency for users accessing the platform from different geographical regions. According to an embodiment of the specification, each stored data record comprises a user-selectable status flag configured to switch the configuration mode of each data record between a master mode, indicating a master data record, and a slave mode, indicating a replicated master data record.

The selectable status flag enables for a data record to be switched between the master and slave mode as required by the application. For example, in the case where the storage partition storing the master data records becomes unavailable, e.g. due to a failure, the status flag on the corresponding copies of the master data record may be switched from the slave mode to the master data record mode and the corresponding storage partition would become in the configuration file as the master storage partition. As a result, the user traffic for accessing master data records may be redirected from the defective storage partition to the new master storage partition specified in the configuration foe. The use of the status flag may reduce downtime of the distributed computer application in the case of user redirection. Each time there is a change in the master data record, e.g. a change in the PNR information, the changes are replicated to the corresponding copies of the updated master data record. For example; a copy of the updated data record is replicated on the associated storage partitions, where it replaces any previous versions. The previous versions of the data record may be stored in a database.

According to an embodiment of the specification, the communication logic is configured to select the data centre for processing user requests based on set of criteria. For example, the set of criteria may comprise the geographic location of the user, the type of user request, the ability of a data centre to process user requests, and the like.

According to an embodiment of the specification, the master data record is shared among a plurality of users and/or user applications. For example, in the context of a travel booking, a master PNR may be shared among different actors e.g. Travel Agent and airline, each having the ability to create and manage the information in the master PNR e.g. updated passenger information.

According to an embodiment of the specification, each storage partitions is instantiated on isolated computing server clusters of a data centre. The specification enables the implementation of a distributed storage model that allows to isolate the technical infrastructure by user. One of the benefits of the isolation approach is that it minimizes the impact for the users of a scheduled or non-scheduled shutdown of a data centre or a storage partition. For example, it allows for maintenance work to be carried out in the technical infrastructure associated with one user without impacting the performance of another user Furthermore, the isolation approach enable to better manage the computing resources allocated to high activity users generating high volumes of data, which was difficult to implement in current systems without affecting the performance of other user of the platform.

According to an embodiment of the specification, the software application is a travel reservation application for booking travel products, which is configured to generate a Passenger Name Record (PNR) data record that is shared among a plurality of travel applications.

The data record generated by the software application of the specification may be configured to be shared among different users and/or user applications for the provision of a service. For example, in the travel sector a Passenger Name Record (PNR) data record may be shared with a plurality of users and software applications for the provision of the travel service e.g. a flight between an origin and a destination. For example, a PNR data record generated by a Travel Agent (TA) or another user may be linked to a plurality of users and/or user applications for the provision of the travel service e.g. airline operating the booked flight, the check-in and boarding software applications, and the like.

According to a second aspect of the specification, a method for handling and storing data records on a distributed computing platform running on a plurality of computing server clusters of at least one data centre is provided. The method comprises: receiving data creation requests from a plurality of users via a communication logic configured for receiving; processing the data creation user requests by means a software application running a computer programme configured to generate one master data record associated with at least one user and/or user application; storing data records at a storage module comprising a plurality of storage partitions, each storage partition is assigned a partition identifier indicating the storage partition associated with each user and the configuration of the storage of the partition as a master, configured for storing master data records, or slave, configured for storing copies of the master data records; routing by means of a routing module each generated master data record to the corresponding master storage partition associated with the user issuing the data creation request; generating by means of the software application for each generated data record a corresponding partition token indicating the partition identifier of the master storage partition corresponding to the user issuing the data creation request; and routing each generated data record to the master storage partition associated with the partition identifier of the generated partition token.

BRIEF DESCRIPTIONS OF THE DRAWINGS

The following drawings are provided as an example to explain further and describe various aspects of the invention.

DETAILED DESCRIPTION

The specification will be illustrated using the exemplified embodiments shown in FIGS. 1 to 8, which will be described in more detail below. It should be noted that any references made to dimensions are only indicative and do not restrict the invention in any, way. While this invention has been shown and described with reference to certain illustrated embodiments thereof, it will be understood by those skilled in the art that various changes in form and details may be made therein without departing from the scope of the invention encompassed by the appended claims. Furthermore, while the invention has been described with references to a particular distributed travel reservation system and/or a method for handling and storing Passenger Name Records (PNRs) data records, it should be understood by those skilled in the art that changes in form and details may be made to facilitate a distributed computing platform for handling and storing other type of data records without departing from the scope of the invention encompassed by the appended claims.

Figure 1:
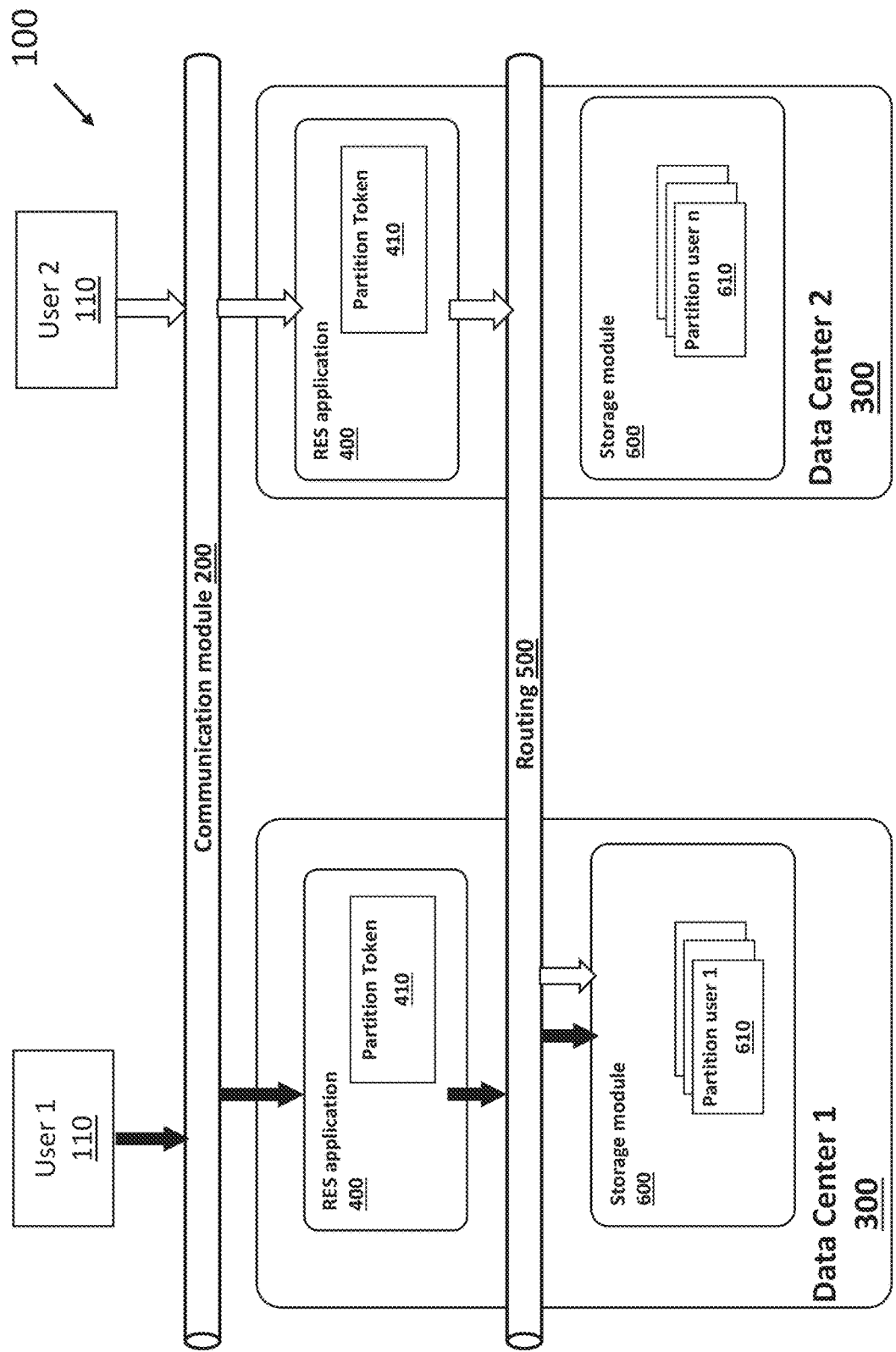
FIGS. 1 to 4 show an exemplified distributed travel reservation platform and its operation under different situations according to embodiments of the specification.

FIG. 1 shows an example of a distributed travel reservation system 100 according to embodiments of the specification. The distributed travel reservation system 100 is provided with a communication module 200, which is configured to connect users 110 to a software application 400 running on computing resources of at least one data centre 300. The software application may be configured as a reservation application enabling users to search and book travel products from different travel providers. In response to a user 100 request to book a travel product, the software application may be configured to generate a master data record, which in the context of a travel booking may take the form of a Passenger Name Record. The software application 400 may be provided with a Partition token module 410, which is configured to generate a partition token identifying the storage partition associated with the user generating the master data record. The partition token module 410 may generate the partition token based on information contained in the master data record and information obtained from a configuration file. For example, the partition token module 410 may generate the partition token by extracting information contained in the master data record relating to the identity of the user generating the master data record. The partition token 410 may identify, based on the extracted information from the master data record, in the configuration file the location of the master storage partition 610 associated with the user generating the master data record. The partition token may then be transmitted to a routing module 500, which is configured to route the master data record to the master storage partition 610 associated with the user. The configuration file provides information relating to the location of the storage partitions 610 associated with each user, which may be updated whenever there is a change in the storage partition configuration. In this way, the routing module 500, with the use of the partition token, is able to route the master data record to the location of the correct storage partition 610. The example shown in FIG. 1, shows two users 110, user 1 and user 2, connected to the distributed travel reservation system 100 according to embodiments of the specification. User 1 may be connected to the system 100 with the intention to generate a master data record, while user 2 may be connected to the system 100 with the intention to access a master data record. For example, in the context of travel reservation, a Travel Agent (TA) may be connected to the system to make a travel booking. The communication module 200 may connect the TA to the closest geographically located data centre that hosts the travel reservation application 400. The TA may commit a booking at the reservation application 400 and a master Passenger Name Record (PNR) is generated. The master PNR is processed by the partition token module 410 and based on the information contained therein and the information in the configuration file, a partition token is generated identifying the location of the master storage partition 610 in the storage module 600 corresponding to the Travel Agent generating the master PNR. The routing module 500, based on the partition token would forward the master PNR to the location of the storage module 600 containing the storage partition 610 associated with the TA, which as shown in FIG. 1 is located in Data centre "1" 300. At the storage module 600, the master PNR would be stored in the associated storage partition 610. A second user, user 2, may want to access the master PNR. For example, the airline operating the flight identified in the PNR may want to access the master PNR committed by the TA. In this case, the airline would connect to the travel reservation system 100 via the communication module 200. The airline request to retrieve the master PNR may be processed by the reservation application 400. The reservation application 400 may be provided with a record locator module configured for locating data records in response to a user requesting the retrieval of a data record. The record locator module may comprise a cache configured for storing the location of each master data record in the storage module. For example, the record module may comprise a list identifying for each master data record the corresponding storage partition location. Moreover, the record locator may comprise a data record broadcasting mechanism, which in response to a user request for accessing a data record, is configured for checking each storage partition to determine the exact location of the requested data record. As shown in FIG. 1, the request of the second user, user 2, would be directed to the location of the master PNR, located in the storage module 600 of data centre "1" 300.

Figure 2:
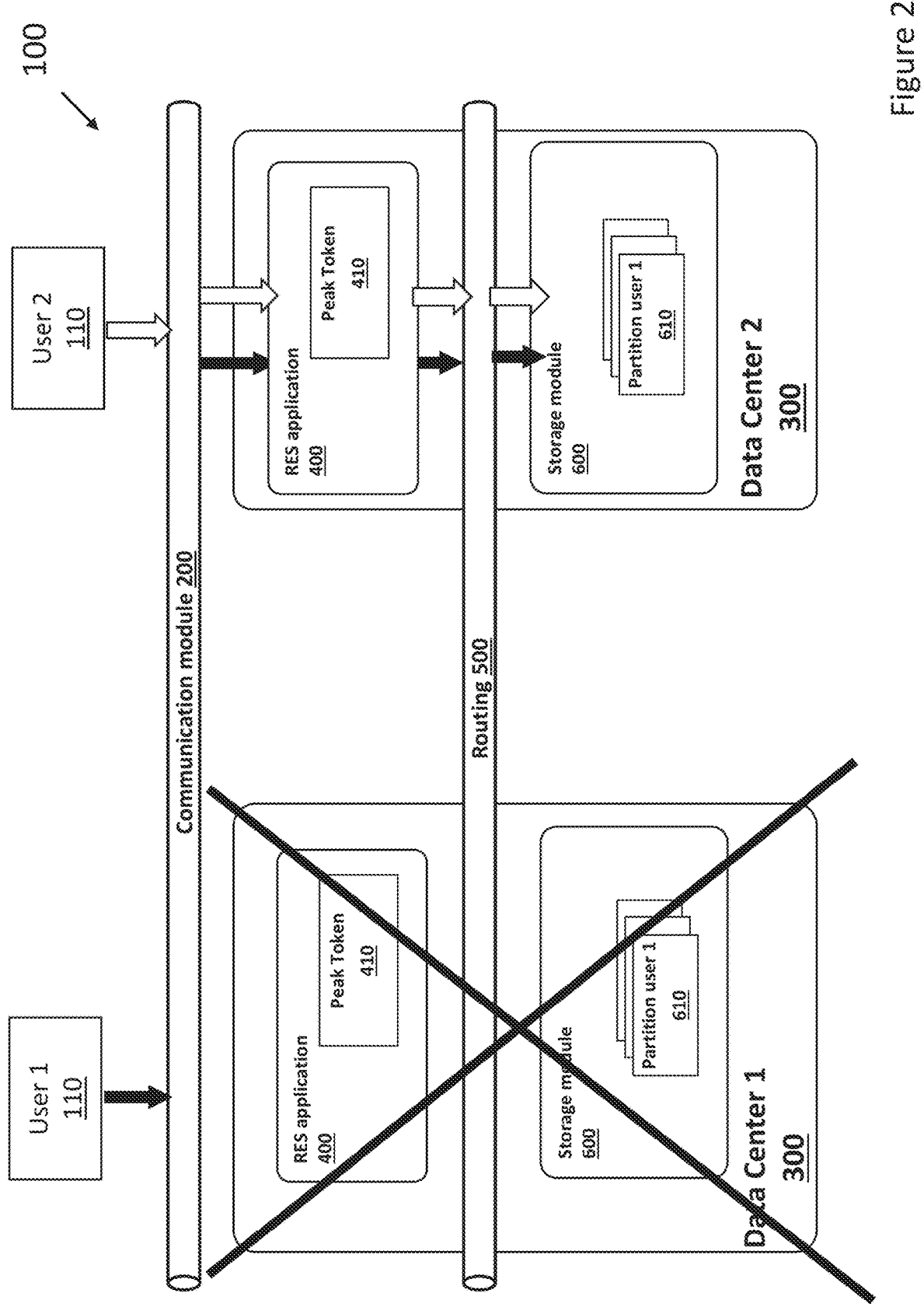

FIG. 2 shows an exemplified embodiment of the specification in the case of a scheduled or non-scheduled shutdown of one the data centres. As shown in FIG. 2, in the where one of the data centres 300, e.g. data centre 1, becomes unavailable, traffic would be directed to another data centres, e.g. data centre 2, which contains a back-up, also referred to as standby, copy of the master data record requested by the second user. In this case, the back-up copy would become the master copy by changing a configuration flag associated with the data record. The configuration status flag may be configured to switch the configuration mode of each data record between a master mode, indicating a master data record, and a slave mode, indicating a replicated master data record, also referred to as back-up or standby copy. The selectable status flag enables for a data record to be switched between the master and slave mode as required by the software application. As shown in FIG. 2, traffic is directed by means of the communication module 200 to the data centre "2".

Figure 3:
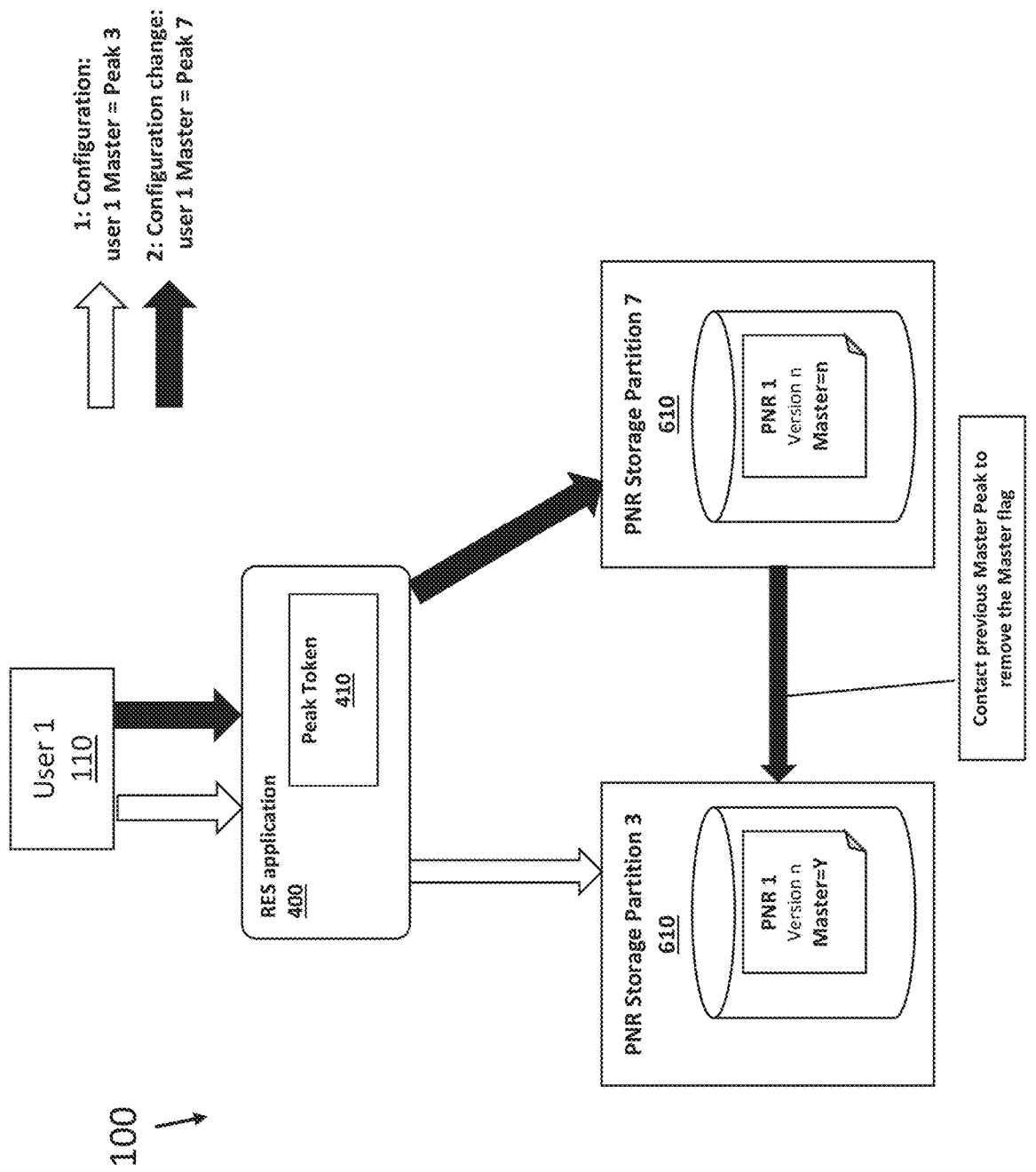

FIG. 3 shows an example of how the PNR storage partition may be changed using the configuration file. As shown in FIG. 3, user "1" may be initially allocated storage partition "3" 610, for storing master data records e.g. PNR. In this case the configuration status flag of the PNR would be set to Master=Yes. In the case of a storage partition configuration change, it may be necessary to also change the location of the master storage partition. For example, during maintenance of the computing resources allocated to storage partition "3" may become unavailable, thereby necessitating a configuration change to ensure the continuous operation of the platform. To facilitate the configuration change, the configuration status flag on a back-up copy of the master PNR stored in storage partition "7" may be changed from slave to master. The new master storage partition 610, partition "7" would contact partition "3" to remove the master flag from the associated PNR, and the configuration file would change accordingly. As a result, user traffic would be directed to partition "7" rather than to partition "3" thus ensuring the continuous operation of the platform.

Figure 4:
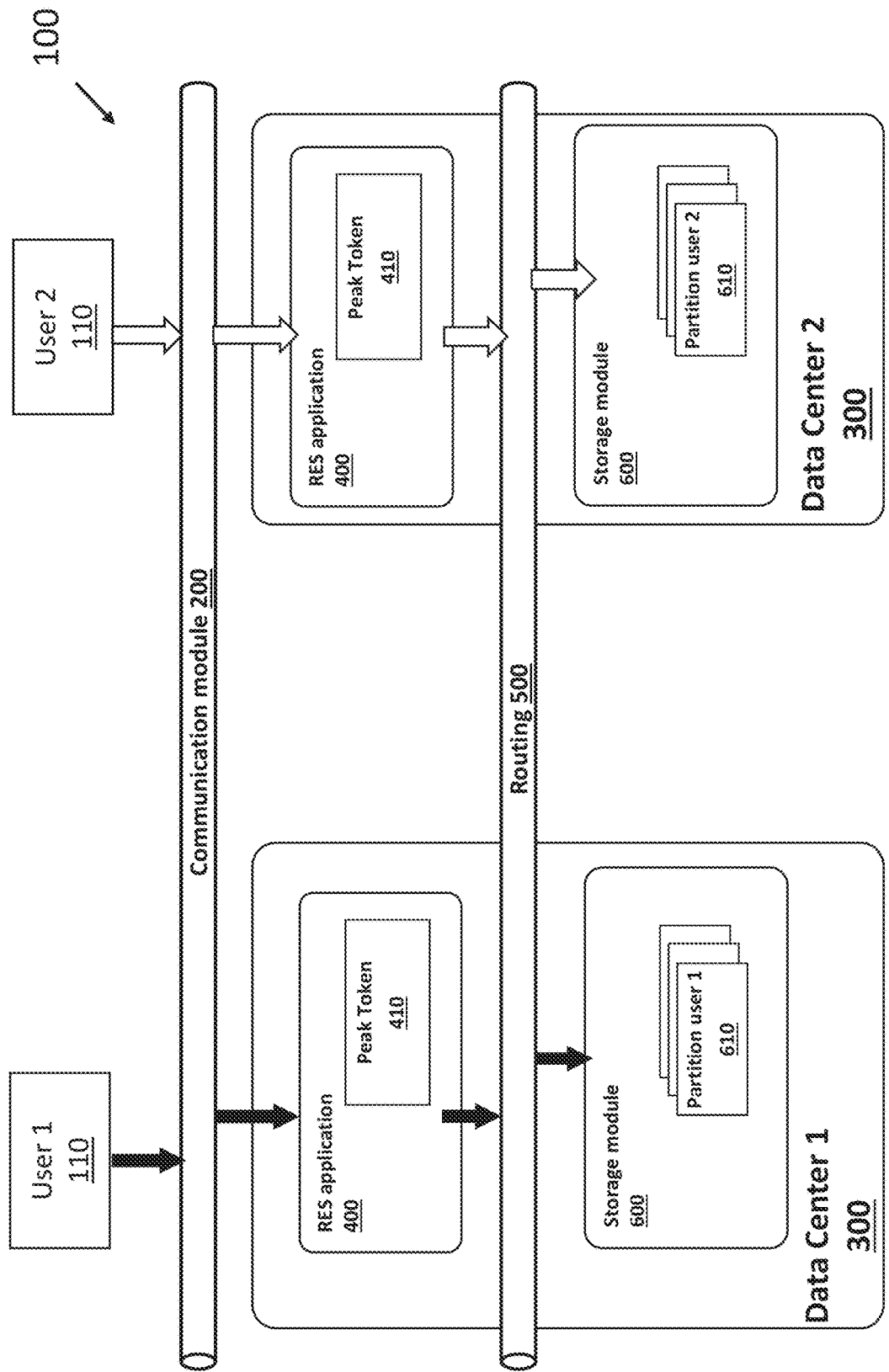

FIG. 4 shows an example of the system 100 according to embodiments of the specification. As shown FIG. 4, depending on the application, it may be better to move the master data record closer to the geographic location of the user that is accessing it to improve latency. For example, the master PNR data record generated by a Travel Agent (TA) 100 may be moved from storage partition 610 of the TA in data centre "1" to the storage partition 610 of the second user (user 2) 100 in data centre "2" 300, which may be geographically located in closer proximity to user 2, thus improving access response.

Figure 5:
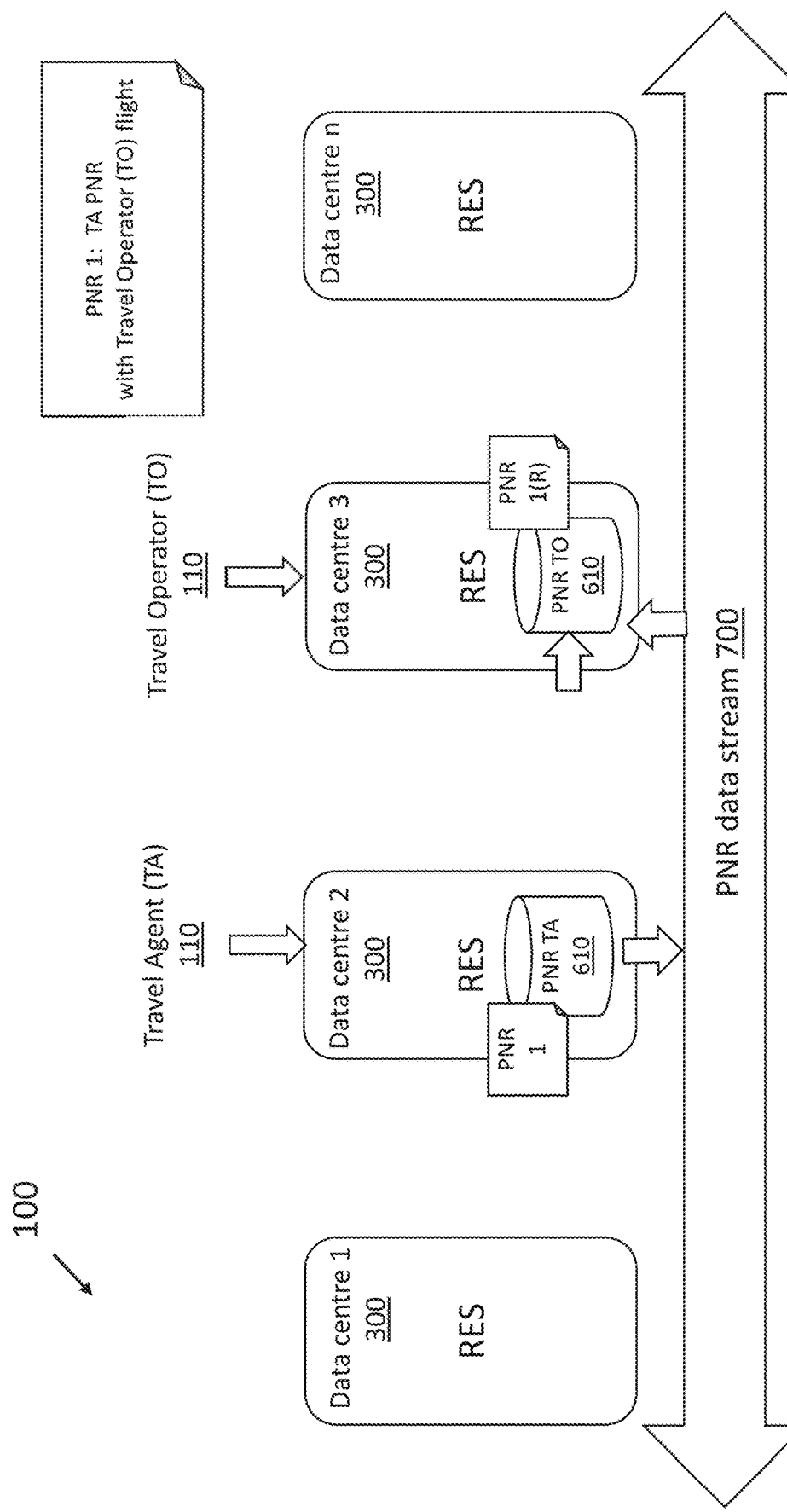
FIGS. 5 to 8 show exemplified implementations of the distributed travel reservation platform in storing a shared PNR created by one or more users according to embodiments of the specification.

FIG. 5 shows an example of the system 100 according to embodiments of the specification. As previously discussed, the system 100 of the specification may be distributed on computing resources of different data centres 300 to improve speed, and resiliency of the platform in the case of a scheduled or non-scheduled shutdown of computing resources. As shown in FIG. 5, the data centres 300 may be connected together via a message data stream 700. A copy of each master data record may be pushed to the message data stream 700 for replication in storage partitions 610 associated with each master data record, which may be located in the same and/or different data centres 300. Each storage partition 610 may comprise a data consumer application configured to monitor the message data stream 700 and retrieve, based on a set of selection criteria, copies of data records associated with the user of each storage partition. For example, the selection criteria may comprise the user identity associated with a data record, the geographic location of the user, and content of the data record, or other selection criteria. As shown in FIG. 5, a Travel Agent (TA) 110 may be configured for storing the master PNR, PNR 1, in the storage partition 610 which is located in data centre "2". At the same time a copy of the PNR 1, PNR 1 (R), may be pushed to the message data stream 700, where it would be picked up by the storage partition 610 of the travel operator (TO), which may be located in data centre "3".

Figure 6:
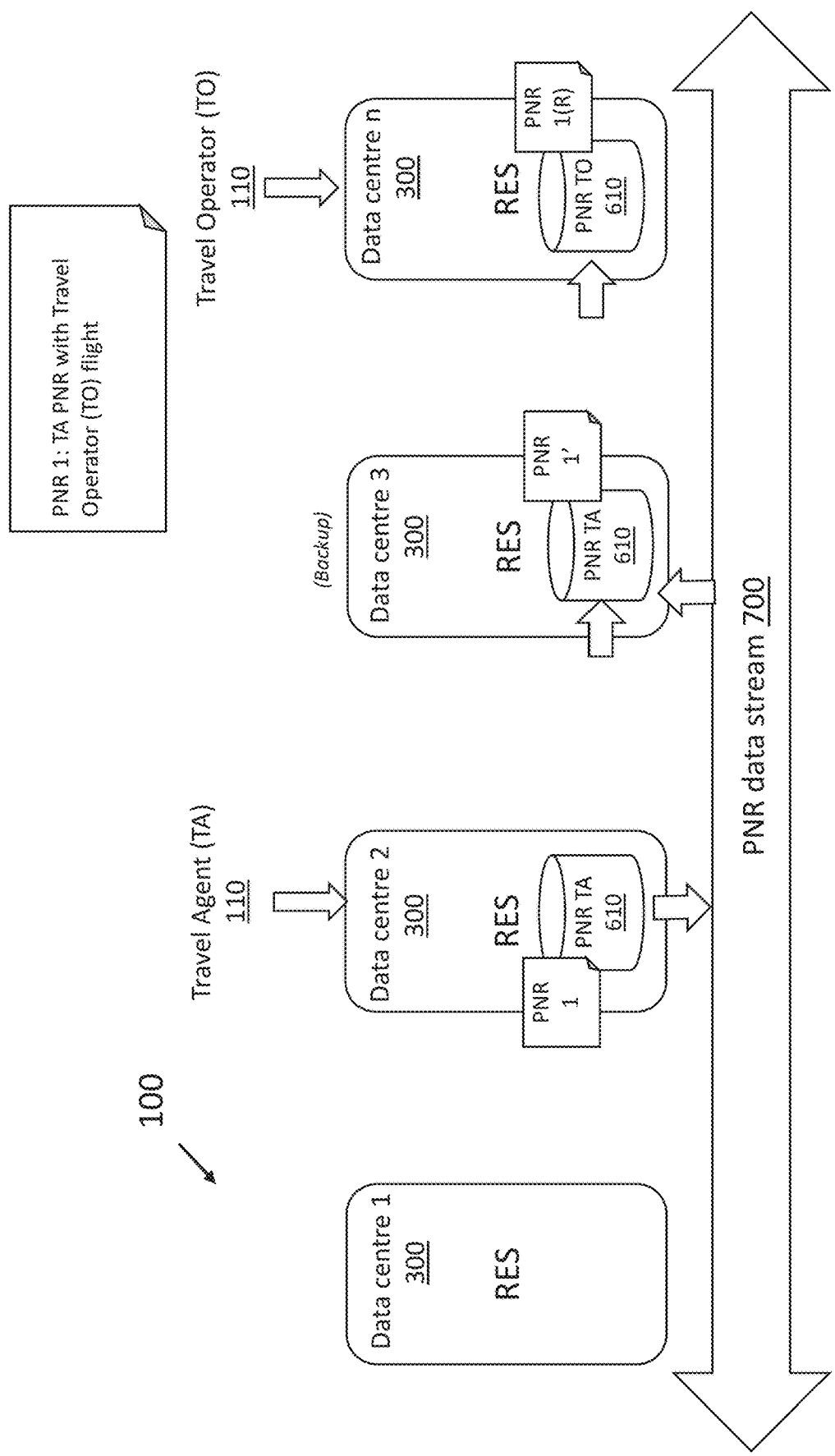

Furthermore, as shown in FIG. 6, a copy of the master data record may be stored in a back-up partition. For example, as shown in FIG. 5, a backup copy of the PNR 1, PNR 1', may be pushed in the message data stream 700 where it would be picked up by the backup storage partition 610 of the TA, which may be located in Data centre 3. Similarly, another copy of the master PNR 1, PNR 1(R), would be picked up by a storage partition of the associated travel operator (TO), which may be located in another data centre 300.

Figure 7:
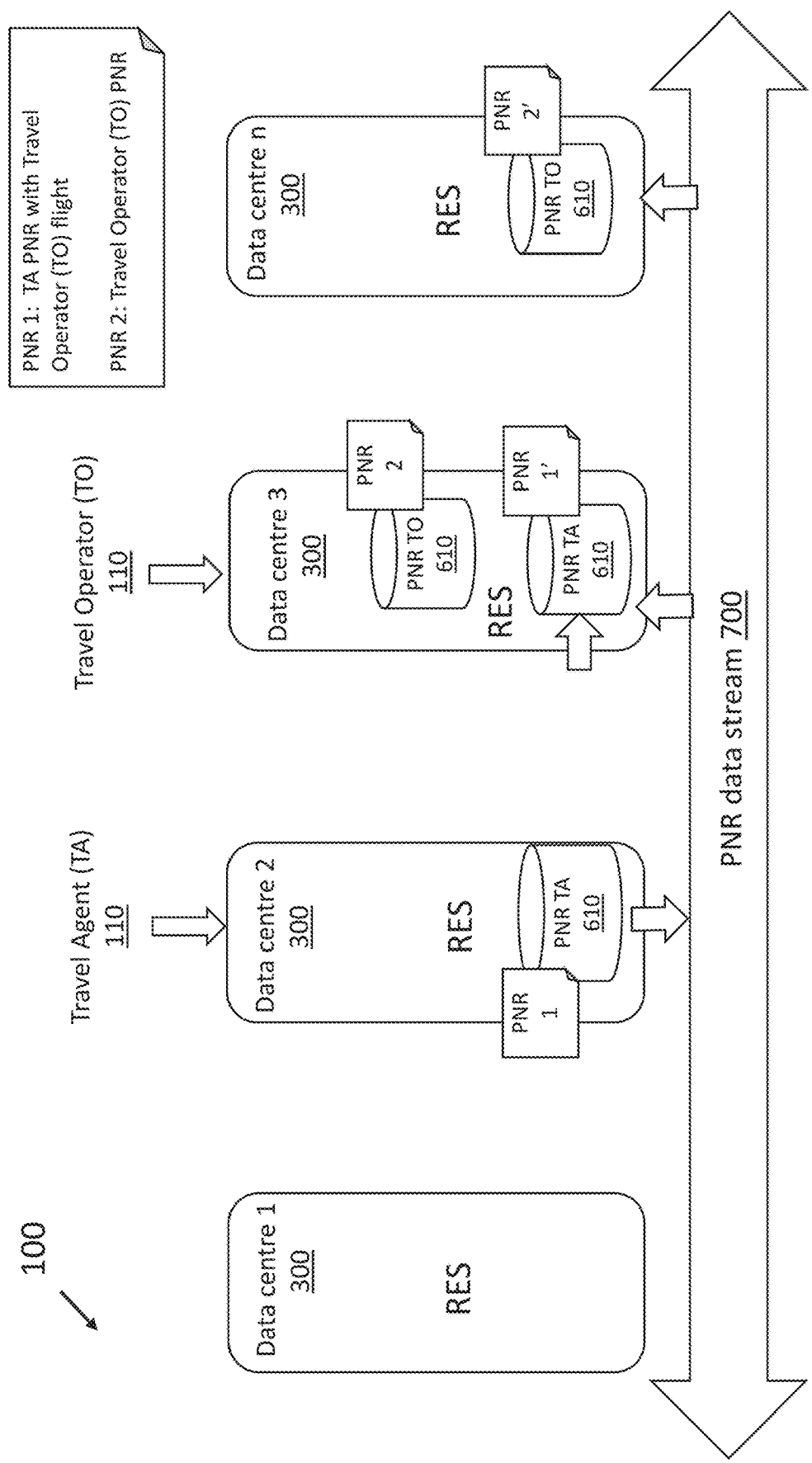

FIG. 7 shows another example of a configuration for storing master and slave data records. As shown in FIG. 7, the backup copy of the master PNR 1, PNR 1', may be saved in a storage partition 610 that is located in the same data centre 300 that contains the storage partition 610 configured to save another master PNR generated by a travel operator (TO), PNR 2. Similarly, a backup copy of the second master PNR 2, PNR 2', may be saved in another storage partition of a different data centre 300.

Figure 8:
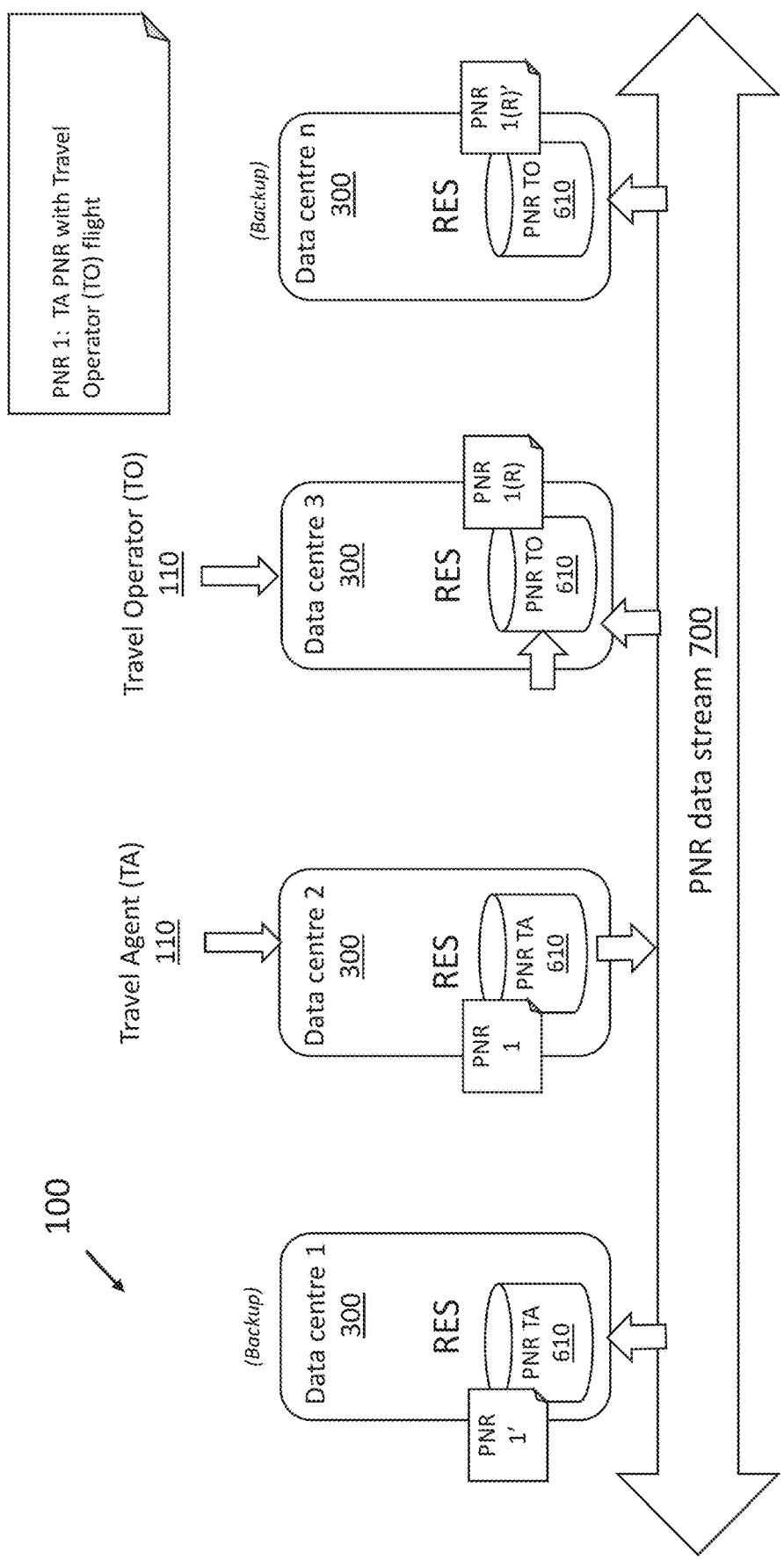

FIG. 8 shows yet another example of a configuration for saving the different versions of the data record. For example, as shown in FIG. 8, the master PNR, PNR 1, may be saved in a storage partition 610 of data centre "2", while the backup copy PNR 1' may be saved in data centre "1". Similarly, the travel operator PNR copy, PNR 1(R), may be saved in data centre while the corresponding TO PNR backup copy, PNR (R)' may be saved in another data centre.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. The computer-readable program instructions for carrying out operations of the embodiments of the invention may be, for example, assembly language or either source code or object code is written in any combination of one or more programming languages.

The program code embodied in any of the applications/modules described herein is capable of being individually or collectively distributed as a program product in a variety of different forms. In particular, the program code may be distributed using the computer-readable storage medium having the computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other robust state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions/acts specified in the flowcharts, sequence diagrams, and/or block diagrams. The computer program instructions may be provided to one or more processors of a general-purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention of the Applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicants general inventive concept.

The invention claimed is:

1. A distributed computing platform for handling and storing data records, the computing platform running on a plurality of computing server clusters of at least one data centre, the distributed computing platform comprising:
   a communication logic configured for receiving data creation requests from a plurality of users;
   a travel reservation application for booking travel products, the travel reservation application configured to process each data creation user request and accordingly generate one master data record associated with at least one user;
   a storage module comprising a plurality of storage partitions for storing data records, each storage partition assigned a partition identifier indicating the storage partition associated with each user and configuration of the storage partition as either (i) a master, configured for storing master data records, or (ii) a slave, configured for storing copies of the master data records; and
   a routing module configured to at least route each generated master data record to the corresponding master storage partition associated with the user issuing the data creation request;
   wherein the travel reservation application is configured to generate for each master data record a corresponding partition token indicating the partition identifier of the master storage partition corresponding to the user issuing the data creation request;
   wherein the routing module is configured to route each master data record to the master storage partition associated with the partition identifier of the generated partition token;
   wherein the communication logic is further configured to receive user access requests for accessing at least one of (i) a stored master data record or (ii) a copy of a master data record;
   wherein the travel reservation application is configured to generate, for each user access request, a partition token identifying the corresponding master or slave storage partition storing the requested data record; and
   wherein the routing module is configured to route each of the user access requests, based on the generated partition token, to the corresponding master or slave storage partition.

2. A distributed computing platform according to claim 1, wherein the travel reservation application is configured to generate copies of the master data records, which are stored in the slave storage partitions associated with the users associated with the master data record.

3. A distributed computing platform according to claim 1, wherein the travel reservation application comprises a configuration file comprising storage partition configuration information indicating at least one of (i) the master storage partitions associated with each user, or (ii) the slave storage partitions associated with each user.

4. A distributed computing platform according to claim 3, wherein the travel reservation application is configured to generate the partition token based on at least one of:
   the configuration file,
   the identity of the user issuing the data request,
   or a type of access request.

5. A distributed computing platform according to claim 4, wherein the computing platform is instantiated on computing server clusters of multiple data centres.

6. A distributed computing platform according to claim 5, wherein the data centres are connected via a message data stream.

7. A distributed computing platform according to claim 6, wherein a copy of each master data record is pushed to the message stream for replication in associated user storage partitions.

8. A distributed computing platform according to claim 7, wherein each storage partition comprises a data consumer application configured to monitor the message data stream and to retrieve, based on a set of selection criteria, copies of data records associated with the user of each storage partition.

9. A distributed computing platform according to claim 8, wherein the selection criteria comprise the user identity associated with a data record, geographic location of the user, and content of the data record.

10. A distributed computing platform according to claim 1, wherein each stored data record comprises a user-selectable status flag configured to switch the configuration mode of each data record between a master mode, indicating a master data record, and a slave mode, indicating a replicated master data record.

11. A distributed computing platform according to claim 1, wherein the communication logic is configured to select the data centre for processing user requests based on a set of criteria.

12. A distributed computing platform according to claim 1, wherein the master data record is shared among a plurality of user applications.

13. A distributed computing platform according to claim 1, wherein the travel reservation application is configured to generate a Passenger Name Record (PNR) data record that is shared among a plurality of travel applications.

14. A method for handling and storing data records on a distributed computing platform running on a plurality of computing server clusters of at least one data centre, the method comprising:

receiving data creation requests from a plurality of users via a communication logic configured for receiving;

processing the data creation user requests by means of a travel reservation application for booking travel products, the travel reservation application configured to generate one master data record associated with at least one user;

storing data records at a storage module comprising a plurality of storage partitions, each storage partition is assigned a partition identifier indicating the storage partition associated with each user and the configuration of the storage of the partition as either (i) a master, configured for storing master data records, or (ii) a slave, configured for storing copies of the master data records;

routing by means of a routing module each generated master data record to the corresponding master storage partition associated with the user issuing the data creation request;

generating by means of the travel reservation application for each generated data record a corresponding partition token indicating the partition identifier of the master storage partition corresponding to the user issuing the data creation request;

routing each generated data record to the master storage partition associated with the partition identifier of the generated partition token;

receiving, via the communication logic, user access requests for accessing at least one of (i) a stored master data record or (ii) a copy of a master data record;

generating, by the travel reservation application, for each user access request, a partition token identifying the corresponding master or slave storage partition storing the requested data record; and routing, by the routing module, each of the user access requests, based on the generated partition token, to the corresponding master or slave storage partition.

\* \* \* \* \*